No. 735,585. PATENTED AUG. 4, 1903.
J. PREUITT & C. W. F. GLANDER.
REACH OR COUPLING POLE FOR VEHICLES.
APPLICATION FILED APR. 9, 1903.
NO MODEL.
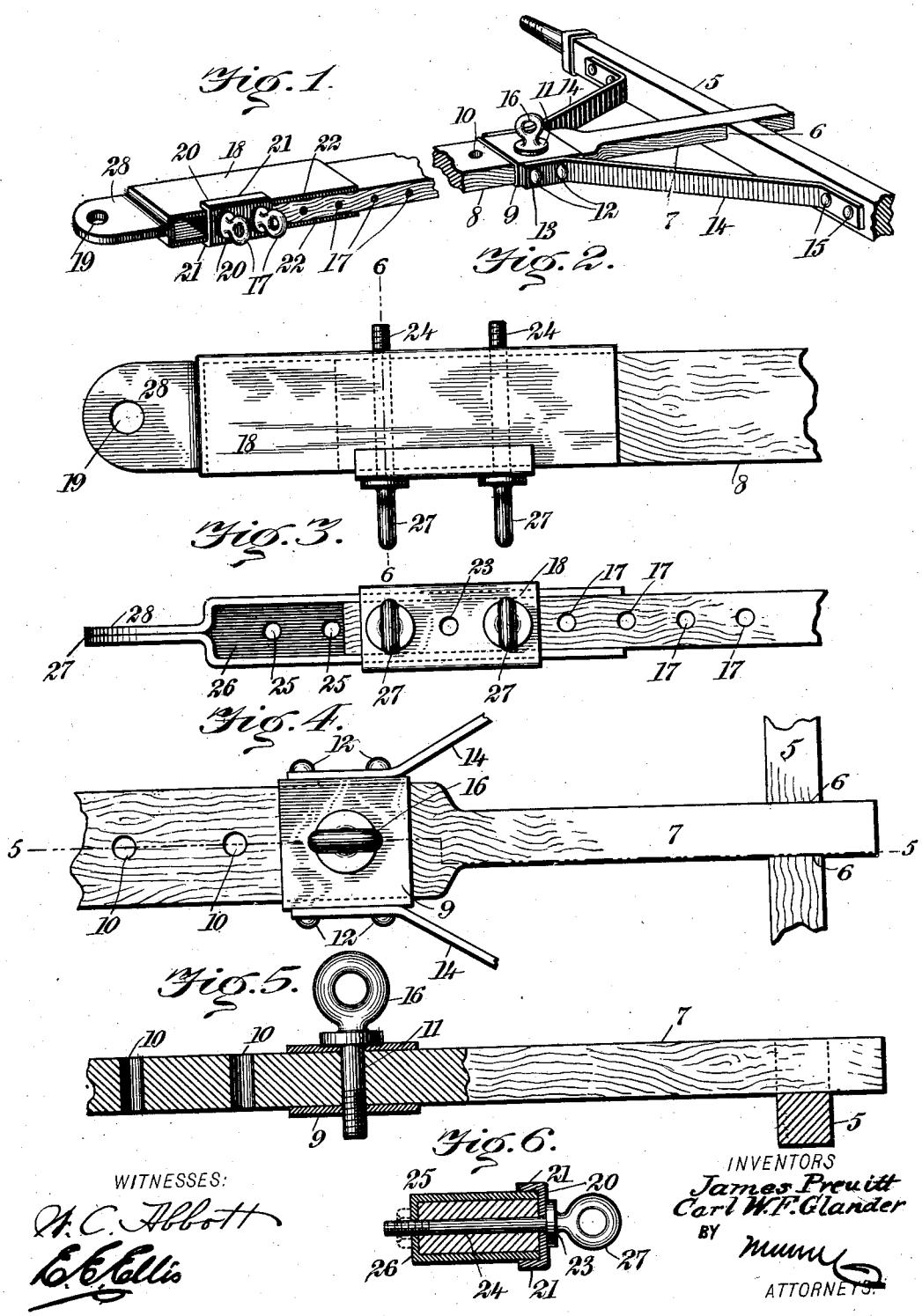
WITNESSES:
INVENTORS
James Preuitt
Carl W. F. Glander
BY
ATTORNEYS No. 735,585. Patented August 4, 1903.

UNITED STATES PATENT OFFICE.

JAMES PREUITT AND CARL W. F. GLANDER, OF WAHPETON, NORTH DAKOTA.

REACH OR COUPLING-POLE FOR VEHICLES.

SPECIFICATION forming part of Letters Patent No. 735,585, dated August 4, 1903.

Application filed April 9, 1903. Serial No. 151,730. (No model.)

*To all whom it may concern:*

Be it known that we, JAMES PREUITT and CARL W. F. GLANDER, both citizens of the United States, and residents of Wahpeton, in the county of Richland and State of North Dakota, have invented a new and Improved Reach or Coupling-Pole for Vehicles, of which the following is a full, clear, and exact description.

This invention relates to reaches or coupling-poles for wagons and other similar vehicles; and it consists substantially in the improvements hereinafter particularly described and claimed.

The invention has for its principal object to provide a reach or coupling-pole for wagons and similar vehicles which is extensible as to length, whereby the same may be adapted to vehicles in which variations may exist in the relative distance between the axles thereof or between the rearward axle and the usual bolster above the forward axle of the vehicle.

The invention also has for its object to provide simple and effective devices or means whereby the extensible part or member of the reach may be quickly adjusted and secured in the desired position with reference to the other part or member thereof, and also to provide equally as effective devices or means whereby the reach as an entirety may be extended and secured in different positions relatively to the rearward axle of the vehicle.

A further object is to provide an extensible and adjustible wagon-reach or coupling-pole which is simple both in the construction and organization of the elements or parts constituting the same and one which is strong and durable and possessing the capacity for long and continued service.

A still further object of the invention is to provide a wagon-reach or coupling-pole involving a comparatively limited number of parts, which are easily and quickly assembled and organized for the performance of their intended functions, besides being light in weight and devoid of cumbersomeness and unnecessary bulk, and also to provide such a device or contrivance which is thoroughly reliable in operation under all conditions of use of the same.

The above and additional objects are attained by means substantially such as we have herein illustrated in the accompanying drawings, in which similar characters of reference denote corresponding parts in all the views.

Figure 1 is a view in perspective of the rearward axle of a wagon or other vehicle, showing our improved reach or coupling-pole as employed in connection therewith, the latter being broken out about centrally thereof. Fig. 2 is an enlarged plan view of the preferred form of our improved wagon-reach or coupling-pole, the same being broken off at one end. Fig. 3 is a side view of the construction shown in Fig. 2. Fig. 4 is an enlarged plan view of as much of our improved reach-bar or coupling-pole as is absent from Fig. 2. Fig. 5 is a side view of the construction shown in Fig. 4, partly in section on the line 5 5 in Fig. 4; and Fig. 6 is a transverse sectional view on the line 6 6 in Fig. 2.

Before proceeding with a more detailed description it may be stated that in practice we construct the reach-bar or coupling-pole preferably of a wooden member having adjustable connection with the rearward axle of a wagon or other vehicle and which is suitably braced, besides being supported horizontally in a guide therefor disposed a suitable distance forwardly of said axle. The guide is provided with means for securing the member referred to in any position to which it is adjusted with reference to the axle, and the forward end of said member is provided with an adjustable clip or additional member, which may be adjusted longitudinally of the said first-named member either to increase or decrease the length of the reach or pole, suitable means being also employed for securing said clip or second-named member in its different positions of adjustment or extensibility relatively to the first-named member.

Specific reference being had to the drawings by the designating characters marked thereon, 5 represents the rearward axle of a wagon or other vehicle, the same being formed in the upper surface thereof, at the center of its length, with, preferably, a rectangular notch or recess, between the sides 6 6 of which is slidably or adjustably received the rectangular portion 7 of the wooden member 8 of our improved reach or coupling-pole, the said portion being reduced in size transversely, as shown. The said member 8 is also slidably fitted in preferably a metallic guide 9, conforming in general shape thereto, and, as will be observed in Figs. 1 and 4, this member is provided at intervals of its length with holes or openings 10, extending vertically therethrough, and working in openings therefor in the upper and lower sides of said guide is a headed pin or bolt 11, designed also to be passed through either of the holes or openings 10 to secure the member 8 of the reach in whatever position it may be adjusted, both in the guide and the notch in the axle. The said guide is supported in position by means of pins or rivets 12 entering the sides thereof after being passed through openings therefor in the forwardly-bent portions 13 at the forward ends of the braces 14 for the reach, the rearward ends of said braces being secured in like manner by rivets 15 to the front face of the axle 5. The head 16 of the pin or bolt 11 may, if desired, be formed of a loop, as shown, to enable the insertion therein of any suitable device or implement for facilitating turning of said pin or bolt. The said member 8 of the reach or coupling-pole is also provided at suitable intervals with holes or openings 17, extending all the way through the same, at the sides thereof, and fitted to the forward end of this member is an additional or extensible member, consisting substantially of a clip 18, of metal, which conforms in general shape to the shape of the member 8, the said clip being hollow, by which to be properly applied in place upon the member 8, and also being closed at its forward end and open both at one side and at the inner or rearward end thereof. At its forward end the said clip or member 18 is provided with a tongue, having therein an opening 19, through which the usual bolt (not shown) may be passed to connect the forward end of our improved reach or pole to the forward axle or bolster (not shown) of a vehicle in a manner well known. It will thus be seen that the reach or pole may be extended by sliding or adjusting the clip or member 18 outwardly or forwardly upon the member 8, and in order to secure the said clip or member in different positions of adjustment we preferably employ a clamp-plate 20, flanged along each longitudinal edge at 21 to lap the edges 22 of the open side of the clip, said clamp-plate having openings 23 therein for receiving, preferably, two screw-bolts 24, which also pass all the way through the openings 17 in the member 8 and through corresponding openings 25 in the closed side 26 of said clip or member 18. The heads of the said bolts may be provided with eye-loops 27, if desired, similarly and for a like purpose as the head of the bolt 11, and in order to secure the bolts 24 in place the sides of the openings 25 may be threaded or suitable nuts may be applied to the ends of the bolts 24, as shown in dotted lines, Fig. 6, for instance.

We may form or construct the clip or member 18 in any suitable manner, a convenient way being to strike the same up out of a flat piece of metal in the form of a blank, and then bend or fold the same into shape in any suitable manner—as upon a former or mandrel, for instance—such form of said clip or member being indicated at Figs. 2 and 3, the line 27 dividing the two free portions, which are bent or brought together to form the tongue 28.

From the foregoing description it will be seen that our improved reach or coupling-pole for vehicles may be adjusted in entirety or as a whole, or that the extensible member 18 thereof may be adjusted either forwardly or rearwardly with reference to the member 8. The construction of the several elements is strong and durable and the organization thereof effective, and while we have herein represented said construction and organization in a certain preferred embodiment it will be understood that we are not limited thereto in precise detail, since immaterial changes therein may be resorted to coming within the scope of our invention.

The marked advantages of our invention are its superiority over other devices of its class, simplicity, ease of adjustment, strength, cheapness of construction, and durability. The adjustments may be made either in the field, away from home, or at any place on the road without any tools whatever simply by pulling the reach out of the whiffletrees.

Having thus described our invention, we claim as new and desire to secure by Letters Patent—

1. The combination with the rearward axle of a vehicle, of braces extending forwardly of the axle, and provided at the forward ends thereof with a guide having registering openings in the upper and lower sides thereof, a reach passing through said guide and directly adjustable at one end with reference to the axle, said reach having vertical openings therein to register with those in the guide, and also having transverse openings forwardly of said vertical openings, a pin for fastening the reach within the guide, a clip having a tongue at its forward end and slidably fitted to the forward part of the reach, said clip being open at one side and end thereof, and formed in said closed side with openings to register with said transverse openings, and a clamp-plate flanged to lap the edges of the open side of the clip, and provided with fastening-bolts for securing the clip in adjusted positions.

2. A reach or coupling-pole for vehicles, comprising a substantially rectangular member having transverse openings therethrough, a clip closed on one side and at one end, respectively, and open at the other side and end thereof, said clip fitting said member at its forward end and being extensible with reference thereto, and a plate flanged to lap the edges of the open side of the clip, and provided with bolts adapted to said openings.

In testimony whereof we have signed our names to this specification in the presence of two subscribing witnesses.

JAMES PREUITT.
CARL W. F. GLANDER.

Witnesses:
W. J. GUNDRY,
W. L. CARTER.